July 21, 1942. E. G. WILLISON 2,290,662
FISHING REEL
Filed Oct. 30, 1939
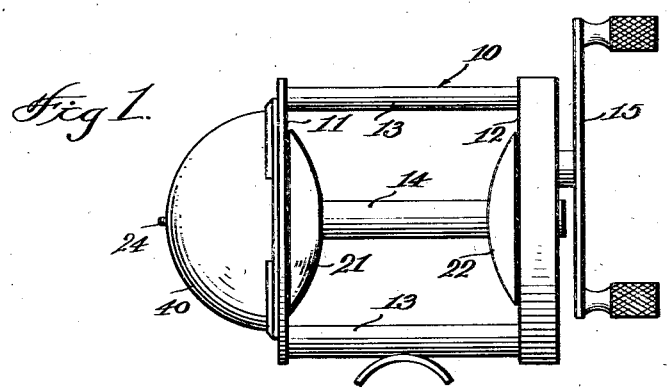
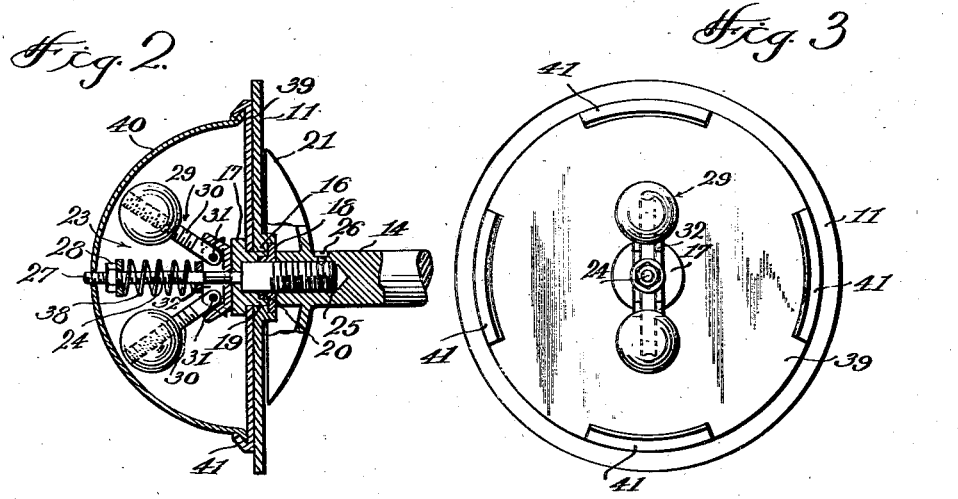
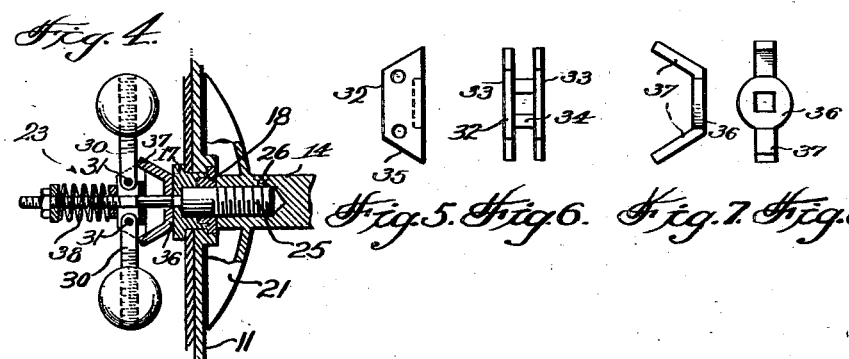
Edward G. Willison, INVENTOR
By Victor J. Evans & Co.
ATTORNEYS Patented July 21, 1942

2,290,662

UNITED STATES PATENT OFFICE 2,290,662

FISHING REEL

Edward G. Willison, Cincinnati, Ohio

Application October 30, 1939, Serial No. 302,039

3 Claims. (Cl. 242—84.5)

The present invention relates to improvements in fishing reels.

The primary object of the invention is to provide in fishing reels a means for preventing back lash of the fishing line as it is unreeled from the reel while casting.

A further object of the invention is to provide an attachment for a fishing reel that serves as a braking means for the shaft of the reel to assure a standard rate of speed between the unreeling fishing line and the shaft of the reel upon which it is wound.

The conventional fishing reel is usually controlled by the thumb of the user so that when casting considerable experience is required to properly throttle the reel with the thumb. Failing to apply the exact pressure on the reel will result in slowing the reel too much or by allowing the reel to revolve faster than the line is being cast will cause the line to wind backwards on the reel causing what is known as back lash. By means of the present invention an automatic means is provided for retarding the speed of rotation of the shaft of the reel to substantially the speed at which the line is being unreeled, thereby overcoming the disadvantage of back lash prevalent with the conventional type of fishing reel.

The invention will be fully and comprehensively understood from a consideration of the following detailed description when read in connection with the accompanying drawing which forms a part of the application.

In the drawing:

Figure 1 is an elevational view of a fishing reel and embodying the features of the present invention.

Figure 2 is a vertical sectional view showing the attachment in position.

Figure 3 is an end elevational view of the attachment with the cover removed.

Figure 4 is a vertical sectional view illustrating the position of the governor arms when the reel is in action.

Figure 5 is a side elevational view of a block member of the device.

Figure 6 is an end elevational view of the same.

Figure 7 is a side elevational view of a web member of the device, and

Figure 8 is an end elevational view of the same.

Referring to the drawing for a more detailed description thereof, there is disclosed a conventional fishing reel 10 comprising end plates 11 and 12, connected by struts or tie rods 13 and a rotating spindle 14 adapted to carry the fishing line, not shown. The mechanism for winding the spindle through the handle 15 is concealed but it is to be understood that said mechanism is conventional and is contained within the end plate 12.

The end plate 11 is formed with a central opening 16 within which bushings 17 and 18 respectively are disposed. Referring more particularly to Figure 2, it will be noted that the spindle 14 has frictional engagement with the bushing 18 and that the bushing 17 is formed with a flanged portion 19 slidably received on the collar 20 of the bushing 18 for a purpose to be hereinafter described. The bushing 18, however, prevents end play of the spindle which would tend to cause the spool to drag against the stationary end of the reel. Bell-shaped caps 21 and 22 respectively are disposed over the spindle 14 and are held in spaced relation from the end plates 11 and 12 respectively, said caps being preferably formed integral with said spindle.

The attachment which serves as a braking means for controlling the speed of rotation of the spindle 14 is generally designated by the reference numeral 23 and comprises a shaft 24, the larger end 25 of which is threadedly received within the end of the spindle 14 and locked therein by means of a set screw or the like 26. The intermediate portion of the shaft 24 is substantially square-shaped in cross section and the opposite end threaded as indicated at 27 for the reception of an adjusting lock nut 28. As is to be understood, the shaft 24 rotates with the spindle 14, said shaft supporting a speed governor 29. The governor 29 comprises a pair of weighted arms 30 pivotally attached as indicated at 31 to the block 32, said block being slidably disposed on the square-shaped section of the shaft 24. The block 32 shown in detail in Figure 5 comprises spaced members 33 and connecting cross members 34 with the ends of the members 33 bevelled as shown at 35.

Disposed on the shaft 24 between the block 32 and bushing 17 is the member 36 shown in detail in Figure 6, said member having web portions 37 extending angularly therefrom and normally disposed between the members 33 of the block 32. A tension spring 38 is also supported on the shaft 24 and is held between washers disposed in front of the forward end of the block 32 and the adjusting nut 28, respectively. The member 36 is adapted to bear against the bushing 17 to retard rotation of the spindle 14 when the governor arms assume a vertical or nearly vertical position as shown in Figure 4, at which time said arms will press against the web portions 37 of the member 36.

A housing in the form of a plate 39 abutting the end plate 11 and supported on the bushing 17 and including a bell-shaped cover plate 40 completely encloses the governor and its associated parts, said cover being retained within flanges 41 formed on the plate 39.

The operation of the device is thought to be readily obvious from the above description when taken in connection with the accompanying drawing. Upon casting the line from the spool mounted on the spindle 14, the spool has a tendency to spin rapidly causing the weighted arms 30 to swing outwardly on their pivots 31 moving the block 32 against the tension of the spring 38. As the arms spread outwardly contact is made with the web portions 37 causing increased pressure of the member 36 against the bushing 17 by virtue of the increased compression of the spring 38 due to its shortening under the influence of the centrifugal weights causing the speed of the spool to be reduced to substantially the speed at which the line is being carried thereby keeping the line free from the spool. As the speed of the reel reduces the weighted arms will be returned to substantially the position shown in Figure 2 of the drawing releasing pressure on the member 36 and allowing the spool to freely rotate. It is to be understood that the reel 10 can be used with or without the device and that the same is readily detachable from the end of the spindle 14.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. In a fishing line reel including a rotating spindle and a plate associated with each end thereof, one end of said spindle having an axial bore therein, a shaft mounted within said bore and extending beyond one end of said spindle for rotation therewith, a block slidably mounted on said shaft exteriorly of one of said plates, said block including a pair of spaced members disposed in parallel relation, a pair of weighted arms pivotally connected to and mounted between said spaced members, a member mounted on said shaft and having opposed angularly directed web portions disposed between said spaced members, and a spring sleeved about the outer portion of the shaft yieldingly forcing the block inwardly toward one of the plates, said weighted arms adapted to bear against and fulcrumed upon the ends of said web portions for urging said web carrying member toward one of said end plates to retard the speed of rotation of the spindle as the line is unreeled therefrom.

2. In a fishing line reel including a rotating spindle and a plate associated with each end thereof, one end of said spindle having an axial bore therein, a shaft mounted within said bore and extending beyond one end of said spindle for rotation therewith, a bushing mounted centrally of the end plate adjacent said shaft, the end of said spindle having the axial bore formed therein having frictional engagement with said bushing, a block slidably mounted on said shaft, said block including a pair of spaced members disposed in parallel relation, a pair of weighted arms pivotally connected to and mounted between said spaced members, a member mounted on said shaft and having web portions disposed between said spaced members, and a compression spring sleeved about the shaft having its outer end fixed thereon and its inner end bearing against the block for yieldingly urging the same toward the center portion of the web-carrying member, said weighted arms adapted to bear against and fulcrumed upon the outer ends of the said web portions for urging said web-carrying member into contact with said bushing to retard the speed of rotation of said spindle as the line is unreeled therefrom.

3. In a fishing line reel including a rotating spindle and a plate associated with each end thereof, one end of said spindle having an axial bore therein, a shaft mounted within said bore and extending beyond one end of said spindle for rotation with said spindle, a bushing mounted centrally of the end plate adjacent said shaft, the end of said spindle having the axial bore formed therein having frictional engagement with said bushing, a block slidably mounted on said shaft, said block including a pair of spaced members disposed in parallel relation, a pair of weighted arms pivotally mounted between said spaced members, a member mounted on said shaft and having web portions disposed between said spaced members, and spring means mounted on said shaft for urging said block toward one of said plates, said weighted arms adapted to contact said web portions in cooperation with said spring means for urging said web-carrying member into contact with said bushing to retard the speed of rotation of said spindle as the line is unreeled therefrom.

EDWARD G. WILLISON.